UNITED STATES PATENT OFFICE.

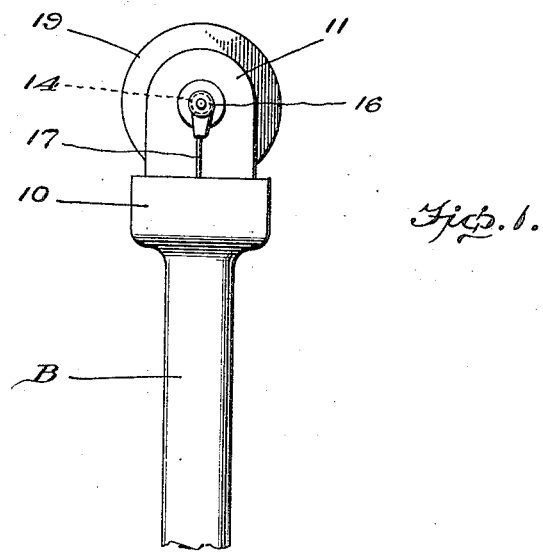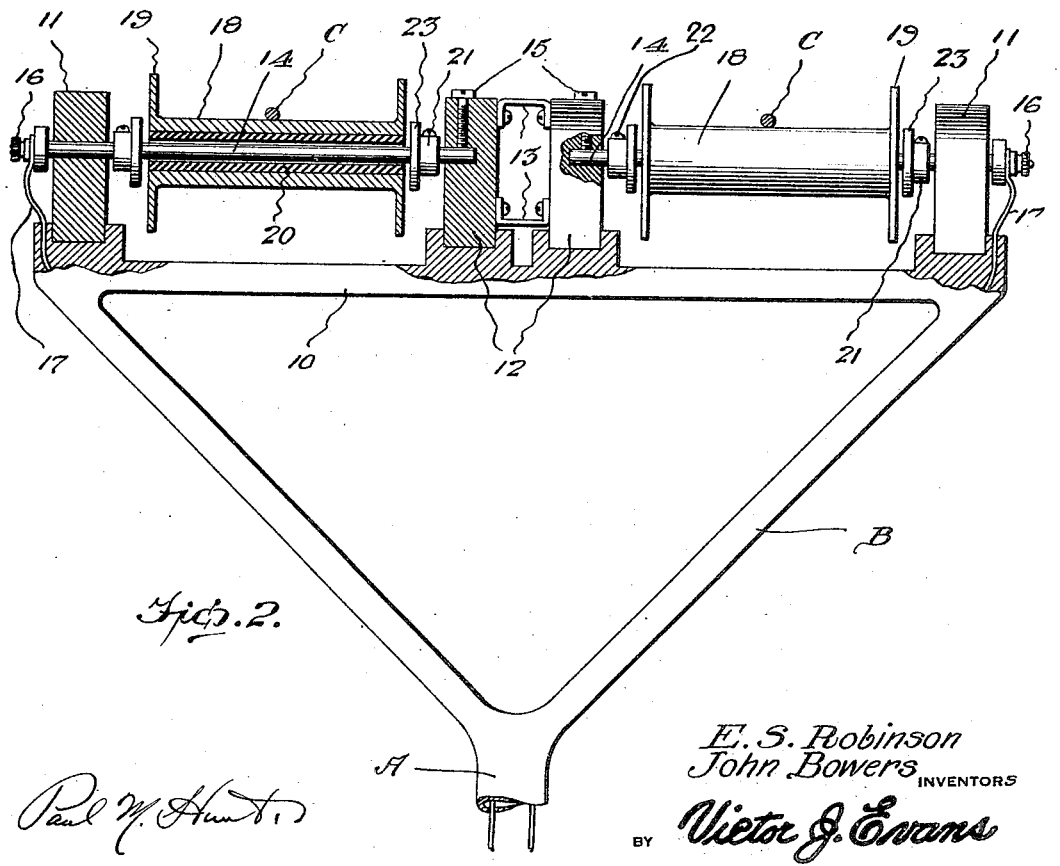

ELLYSON SHIRLEY ROBINSON AND JOHN BOWERS, OF RICHMOND, VIRGINIA.

TROLLEY WHEEL.

1,417,350.          Specification of Letters Patent.      Patented May 23, 1922.

Application filed January 3, 1922. Serial No. 526,728.

*To all whom it may concern:*

Be it known that we, ELLYSON SHIRLEY ROBINSON and JOHN BOWERS, citizens of the United States, residing at Richmond, in the county of Henrico and State of Virginia, have invented new and useful Improvements in Trolley Wheels, of which the following is a specification.

This invention relates to trolley wheels and has for its object the provision of a novel trolley wheel designed for use in connection with the trolley poles of the trackless trolley cars or busses.

It is well known in the art that the trackless cars or busses must have two trolley wires in order to complete the circuit as there is no ground connection. It is also understood and well known that such vehicles do not always pursue exactly a straight path as it is necessary that certain deviations be made. To some extent this has been taken care of by the provision of trolley poles which are capable of lateral movement to a great extent. Heretofore, it has been difficult to operate such vehicles successfully owing to the lack of satisfactory trolley wheels which will always insure the conduction of current to the vehicle. It is with these facts in view that the present invention has been designed.

An important and more specific object is the provision of a trolley wheel structure including two separately mounted rollers which engage the trolley wires and which are flanged for preventing disengagement with respect to the wires.

An additional object is the provision of a device of this character which will be simple and inexpensive in manufacture and installation, highly efficient in use, positive in action, durable in service and a general improvement in the art.

With the above and other objects and advantages in view, the invention consists in the details of construction to be hereinafter more fully described and claimed, and illustrated in the accompanying drawings in which, Figure 1 is an elevation of our device associated with an ordinary trolley pole of the laterally movable type.

Figure 2 is a longitudinal sectional view.

Referring more particularly to the drawings the letter A designates a trolley pole of the type which is used on trackless motor vehicles or trolley cars, and B designates the head thereof. The head B includes an uppermost supporting bar 10 upon the ends of which are secured blocks 11 of fibre or other suitable insulating material. Secured upon the central portion of the member 10 are similar blocks 12 which are held in spaced relation by means of suitable braces 13. Extending through the outermost block 11 and extending into the inner block 12 are spindles 14 which are held against longitudinal displacement by means of suitable set screws 15 which are threaded into the blocks 12 and which engage the spindles. The outer ends of the spindles carry clamping nuts 16 by means of which connection may be made with the wires 17 which extend to the trolley pole. The wires 17 are of course conducted down into the vehicle to the motor thereof in the usual manner.

Rotatably mounted upon the spindles 14 are spools 18 which engage the trolley wires C and these spools are formed at their ends with retaining flanges 19 whereby to prevent disengagement thereof from the trolley wires. The spools are provided with bushings 20 preferably of graphite to insure proper contact and it is to be understood that the spools are of course formed metallic. The spools are prevented from longitudinal displacement with respect to the spindles by means of stop collars 21 which are held in position by means of suitable set-screws 22 engaging the spindles. It is also preferable to provide wear washers 23 between these stop-collars 21 and the adjacent ends of the spools.

In the operation of the device it will be seen that the current carried by one of the trolley wires will pass down through one of the spools and then through the wire 17 to the motor of the trackless trolley car and that the current will return from the motor through the other wire 17 to the other spool 18 and thence to the other trolley wire. Owing to the width of these spools it will be apparent that there is considerable lateral movement of the trolley head permissible with respect to the trolley wires and owing to the provision of the flanges 19 it will be readily apparent that disengagement of the spools from the wires will be prevented.

From the foregoing description and a study of the drawings it will be apparent that we have thus provided a simply constructed and consequently inexpensive trolley pole head which is particularly advantageous for use in connection with the trackless trolley cars in which the use of two trolley wires is an absolute necessity.

While we have shown and described the preferred embodiment of the invention, it is of course to be understood that we reserve the right to make such changes in the form, construction and arrangement of parts as will not depart from the spirit of the invention or the scope of the subjoined claims.

Having thus described the invention we claim;

1. A trolley pole head comprising a support, a pair of longitudinally aligned spindles stationarily mounted thereon, wires connected with said spindles and extending downwardly along the trolley pole, and spools rotatably mounted upon the spindles and having end flanges.

2. A trolley pole head comprising the combination with a trolley pole, of a support, a pair of outer blocks of insulating material carried by said support, a pair of inner blocks carried by said support and likewise formed of insulating material, a pair of longitudinally aligned spindles extending through said outer blocks and into the associated inner blocks and held stationary, said spindles being adapted for connection with current carrying wires leading down into the vehicles equipped with the device, and a pair of flanged spools rotatably mounted upon said spindles and normally contacting with a pair of trolley wires, said spools being provided at their ends with flanges and being formed at their centers with graphite bushings.

In testimony whereof we affix our signatures.

ELLYSON SHIRLEY ROBINSON.
JOHN BOWERS.